United States Patent [19]

Reichel et al.

[11] 4,455,397

[45] Jun. 19, 1984

[54] POLYISOCYANURATE FOAMS PREPARED FROM PARTIALLY ETHERIFIED METHYLOLAMINES

[75] Inventors: Curtis J. Reichel, Wyandotte; Thirumurti Narayan, Grosse Ile; John T. Patton, Jr., Wyandotte, all of Mich.

[73] Assignee: BASF Wyandotte Corporation, Wyandotte, Mich.

[21] Appl. No.: 531,867

[22] Filed: Sep. 14, 1983

[51] Int. Cl.³ .................................................. C08G 18/14
[52] U.S. Cl. ...................................................... 521/166
[58] Field of Search .......................................... 521/166

[56] References Cited

U.S. PATENT DOCUMENTS

| 3,135,707 | 6/1964 | Nyquist et al. | 521/166 |
| 4,139,501 | 2/1979 | Rudner et al. | 521/115 |
| 4,197,373 | 4/1980 | Miano et al. | 521/166 |

*Primary Examiner*—Maurice J. Welsh
*Attorney, Agent, or Firm*—Norbert M. Lisicki

[57] ABSTRACT

Polyisocyanurate foams are prepared from reacting partially etherified methylolmelamines either alone or in mixture with polyoxyalkylene polyether polyols with polyisocyanates. Improved friability and flame retardancy are obtained.

5 Claims, No Drawings

POLYISOCYANURATE FOAMS PREPARED FROM PARTIALLY ETHERIFIED METHYLOLAMINES

BACKGROUND OF THE INVENTION

1. Field of the Invention

The present invention relates to polyisocyanurate foams prepared from partially etherified methylolamines with polyisocyanates in the presence of trimerization catalysts.

2. Description of the Prior Art

The prior art generally teaches the preparation of isocyanurate-modified foam products.

U.S. Pat. No. 4,139,501 teaches the preparation of polyurethane foam with enhanced flame retardancy by the reaction of a polyol and an organic polyisocyanate in mixture with a hydroxylmethylmelamine derivative and including therein a halogenated phosphorus ester.

U.S. Pat. No. 4,197,373 teaches the preparation of flame retardant polyurethane foams from a reaction mixture containing the reaction products of melamine and chloral and optionally alkylene oxide adducts thereof.

U.S. Pat. No. 3,135,707 teaches the use of partially alkylated polymethylolmelamines for the preparation of polyurethane foams. There is no teaching in the prior art that improved flame retardant polyisocyanurate foams may be prepared employing partially etherified methylolmelamines either alone or in combination with other polyols.

SUMMARY OF THE INVENTION

The present invention relates to the preparation of polyisocyanurate foams by reacting partially etherified methylolmelamines with polyisocyanates in the presence of trimerization catalysts.

DESCRIPTION OF THE PREFERRED EMBODIMENT

In accordance with the invention, etherified methylolmelamines are prepared by reacting an aqueous solution of formaldehyde with melamine employing an alkaline catalyst. After the reaction has proceeded at elevated temperatures, an etherifying hydroxyl containing compound is added, followed by an acid catalyst and the etherification process is allowed to proceed. After the reaction is complete, the product is obtained by neutralization of the acid filtration of the salts, and vacuum stripping of the volatiles.

The etherified methylolmelamine employed in the invention is the condensation product of melamine and formaldehyde in the first stage of the reaction. In the second stage, etherification is accomplished by reacting an alcohol with the methylolmelamine to form a product having the following formula:

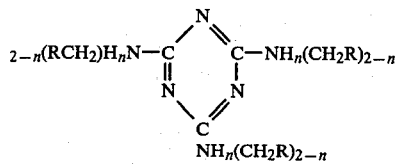

wherein
n is an integer from 0 to 2
R is selected from the group consisting of

—OH,
—O—$C_xH_{2x+1}$,
—O—$C_xH_{2x}OC_xH_{2x}OH$,
—O—$C_xH_{2x-y+1}Y_y$,
—O—$C_zH_{2z-1}$,

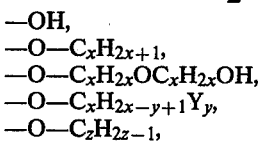

—O—$C_xH_{2x}NH$—R',
—O—$C_xH_{2x}$—NH—$C_xH_{2x}$—OH,

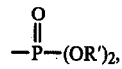

and
—O—$C_xH_{2x}$—O—R' wherein y is an integer from 1 to 3 and R' is an alkyl containing 1 to 4 carbon atoms, x is an integer from 1 to 5, Y is bromine or chlorine, and z is an integer from 2 to 5 and with the proviso that at least two of the R groups are OH.

The preferred ratio of formaldehyde to melamine is 7:1 to 8:1 while the preferred ratio of alcohol to melamine is 13:1 to 15:1.

Any alkaline catalyst may be employed. Examples include sodium hydroxide, potassium hydroxide, sodium methoxide etc. The acid catalysts which may be employed are nitric acid, hydrochloric acid, phosphoric acid and sulfuric acid. The hydroxyl group containing compounds which may be employed for the etherification are those which have the formula:

$C_xH_{2x+1}OH$,
$HOC_xH_{2x}OC_xH_{2x}OH$,
$C_xH_{2x-y+1}Y_yOH$,
$C_zH_{2z-1}OH$,
$HOC_xH_{2x}NH$—R',
HO—$C_xH_{2x}$—NH—$C_xH_{2x}$—OH,

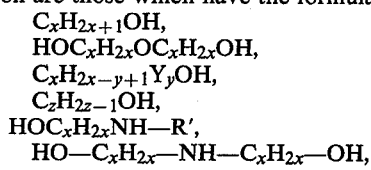

and
HO—$C_xH_{2x}$—O—R' wherein x, y, z, R' and Y are as defined above.

It is further contemplated that compounds having the formula:

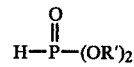

may be employed wherein R' is an alkyl radical containing from 1 to 4 carbon atoms.

The phosphorus compounds are generally employed in combination with the other compounds listed above in order to provide that at least two R groups are OH.

The partially etherified methylolmelamines are reacted with polyisocyanates in the presence of trimerization catalysts and blowing agents to produce polyisocyanurate foams.

The organic polyisocyanate employed in the instant invention corresponds to the formula R'(NCO)z where R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 1,3-diisocyanato-o-xylene, 1,3-diisocyanato-p-xylene, 1,3-diisocyanate-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 2,4'-diphenylmethane diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate and mixtures thereof.

The polyisocyanurate foams of the instant invention may be prepared by employing well-known compounds as trimerization catalysts. Examples of these catalysts are (a) organic strong bases, (b) tertiary amine co-catalyst combinations, (c) Friedel Craft catalysts, (d) basic salts of carboxylic acids, (e) alkali metal oxides, alkali metal alcoholates, alkali metal phenolates, alkali metal hydroxides and alkal metal carbonates (f) onium compounds from nitrogen, phosphorus, arsenic, antimony, sulfur and selenium, and (g) mono-substituted monocarbamic esters. These include 1,3,5-tris(N,N-dialkylaminoalkyl)-s-hexahydrotriazines; the alkylene oxide and water additives of 1,3,5-tris(N,N-dialkylaminoalkyl)-s-hexahydrotriazines; 2,4,6-tris(dimethylaminomethyl)phenol; ortho, para- or a mixture of o- and p-dimethylaminomethyl phenol and triethylenediamine or the alkylene oxide and water adducts thereof, metal carboxylates such as potassium octanoate, sodium and potassium salts of hydroxamic acid, and organic boron-containing compounds. Monofunctional alkanols containing from 1 to 24 carbon atoms, epoxides containing 2 to 18 carbon atoms and alkyl carbonates may be used in conjunction with tertiary amine to accelerate the rate of the polymerization reaction. The concentration of trimerization catalysts that may be employed in the present invention is from 0.001 part to 20 parts of catalyst per 100 parts of organic polyisocyanate. The temperature ranges which may be employed for the polymerization reaction may range from 25° C. to 230° C., preferably from 15° C. to 120° C.

In accordance with the present invention, rigid, flexible, and microcellular foams may be prepared by the catalytic reaction of organic polyisocyanates with polyols containing therein the etherified methylolmelamine in the presence of blowing agents, trimerization catalysts, surfactants and other additives which may be deemed necessary. Non-cellular products may also be prepared in the absence of blowing agents.

Typical optional polyols which may be employed in the preparation of the foams of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly- 1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing poyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylene diamine, 1,3-diaminopropane, 1,3-diaminobutane, and 1,4-diaminobutane.

Water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methylpiperazine.

A surface-active agent is generally necessary for production of high grade polyurethane foam according to the present invention, since in the absence of same, the foams collapse or contain very large uneven cells. Numerous surface-active agents have been found satisfactory. Nonionic surface-active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

In the following examples, all parts are by weight unless otherwise designated and the following abbreviations are employed.

Etherifying agent
  A—butanol
  B—methanol
  C—dibromopropanol
  D—trichloroethanol
  E—2-ethoxyethanol
  F—furfuryl alcohol
  G—allyl alcohol
  H—2-chloroethanol
  I—diethylene glycol
  J—diethanolamine
  K—diethylphosphite
  L—N-methylethanolamine Polyol A—a propylene oxide adduct of pentaerythritol having a hydroxyl number of 400.

Freon 11A—monochlorotrifluoromethane sold by E. I. duPont de Nemours & Co.

L-5303—a silicone surfactant

TDH—1,3,5-tris(N,N-dimethylaminopropyl)-S-hexahydrotriazine

T-9—stannous 2-ethylhexanoate

EXAMPLES 1-12

Into a suitable reaction vessel equipped with a stirrer, reflux condenser, and thermometer was added formaldehyde, melamine, neutralized formalin solution and one-half of the etherifying agent or mixtures thereof in the amounts indicated in the Table below. The amount of sodium hydroxide varied from 0.75 pbw to 2.0 pbw. The mixture was heated to about 55° C. for two hours. After cooling, the remaining amount of etherifying agent was added and the mixture was heated to 35° C. The alkaline catalyst was neutralized with nitric acid, the reaction solution was then vacuum stripped at 50° C. to remove all volatiles. The residue was then washed with methylene chloride, filtered, and the product obtained by vacuum stripping the volatiles at 50° C.

TABLE I

| Example | Melamine, pbw | Formaldehyde, pbw | Etherifying agent, pbw | OH No. |
| --- | --- | --- | --- | --- |
| 1 | 126 | 567 | A, 370 | 208 |
| 2 | 126 | 312 | B, 480 | 234.6 |

TABLE I-continued

| Example | Melamine, pbw | Formaldehyde, pbw | Etherifying agent, pbw | OH No. |
|---|---|---|---|---|
| 3 | 63 | 156 | B, 122 C, 828 | 75.1 |
| 4 | 63 | 156 | B, 122 D, 500 | 350 |
| 5 | 126 | 312 | E, 1210 | 223.9 |
| 6 | 126 | 568 | F, 686 | 414.3 |
| 7 | 315 | 780 | G, 1885 | 278 |
| 8 | 126 | 312 | H, 1077 | 382 |
| 9 | 126 | 312 | B, 448 I, 106 | 511 |
| 10 | 126 | 312 | B, 480 J, 005 K, 138 | 727 |
| 11 | 126 | 312 | B, 320 L, 225 K, 278 | 546 |
| 12 | 315 | 780 | B, 1200 | 380 |

EXAMPLES 13-24

The designated resin, with or without added Polyol A (300 pbw), 9.0 pbw Freon 11A, 4 parts L-5303, 2.1 parts TDH catalyst and 0.1 parts of T-9 catalyst were mixed for 30 seconds. Crude MDI was added, the mixture was stirred for 10 seconds and the entire mixture poured into a one-gallon container and the foam was allowed to rise. The resulting foams were cured at room temperature for 25 hours. The resins employed and the resulting physical properties of the foams are shown in Table II below. Improvements in smoke density, friability and weight retained in the Butler chimney test are shown when the resins of the invention are employed.

TABLE II

| Example | 13 | 14 | 15 | 16 | 17 | 18 | 19 | 20 | 21 | 22 | 23 | 24 |
|---|---|---|---|---|---|---|---|---|---|---|---|---|
| Resin of Example | — | 2 | 12 | — | 2 | 4 | 5 | 5 | — | 1 | 2 | 5 |
| Polyol | A | A | — | A | A | A | A | — | A | A | A | — |
| Resin/polyol ratio | — | 1:1 | — | — | 1:1 | 10:1 | 1:1 | — | — | 1:1 | 1:1 | 1 |
| Isocyanate Index | 200 | 200 | 200 | 300 | 300 | 300 | 300 | 300 | 400 | 400 | 400 | 400 |
| Properties | | | | | | | | | | | | |
| Core Density, pcf | 2.34 | 2.07 | 1.51 | 2.29 | 1.65 | 1.52 | 1.95 | 2.14 | 2.39 | 1.87 | 1.67 | 2.03 |
| Compressive strength, psi; 10% defl | 31.4 | 21.2 | 12.4 | 29.2 | 19.8 | 17.0 | 22.0 | 23.6 | 31.3 | 20.5 | 18.9 | 19.8 |
| Friability, % wt. loss | 11.3 | 46.1 | 85.3 | 21.1 | 61.6 | 67.3 | 57.6 | 51.6 | 23.6 | 68.6 | 66.1 | 62.5 |
| Closed cells, % | | | | | | | | | | | | |
| Uncorrected | 88.4 | 87.0 | 82.5 | 87.7 | 87.2 | 89.3 | 84.5 | 85.9 | 87.2 | 83.9 | 85.4 | 83.5 |
| Corrected | 95.1 | 95.0 | 96.3 | 95.6 | 96.6 | 102.0 | 94.3 | 101.7 | 96.2 | 95.2 | 93.7 | 102.8 |
| K-factor | .120 | .126 | .144 | .120 | .148 | .150 | .140 | .160 | .125 | .150 | .151 | .161 |
| Flammability Tests | | | | | | | | | | | | |
| NBS Smoke Density, Dm | 147 | 60 | 32 | 128 | 51 | 57 | 61 | 35 | 113 | 55 | 43 | 37 |
| Oxygen Index, % O2 | 19.94 | 19.74 | 22.65 | 20.93 | 21.12 | 21.89 | 20.73 | 20.93 | 21.51 | 22.65 | 21.89 | 21.89 |
| Butler Chimney | | | | | | | | | | | | |
| % wt. retained | 25.8 | 44.6 | 80.7 | 53.8 | 57.1 | 54.8 | 56.2 | 78.5 | 73.5 | 56.4 | 67.5 | 84.9 |
| Time to SX, sec. | 38 | 27 | 10 | 19 | 17 | 17 | 21 | 10 | 12 | 16 | 14 | 10 |
| Flame ht., cm. | 25 | 25 | 25 | 25 | 25 | 25 | 25 | 25 | 25 | 25 | 25 | 25 |

The embodiments of the invention in which an exclusive privilege or property is claimed are defined as follows:

1. A polyisocyanurate foam prepared by reacting (a) a polyol, (b) an organic polyisocyanate, (c) blowing agent, in the presence of a trimerization catalyst, wherein the polyol is selected from the group consisting of a partially etherified methylolmelamine and a mixture of a polyoxyalkylene polyether polyol and said methylolmelamine.

2. The foam of claim 1 wherein said methylolmelamine has the formula

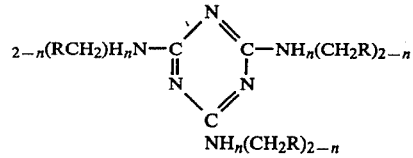

wherein
n is an integer from 0 to 2.
R is selected from the group consisting of
—OH,
—O—$C_xH_{2x+1}$,
—O—$C_xH_{2x}OC_xH_{2x}OH$,
—O—$C_xH_{2x-y+1}Y_y$,
—O—$C_zH_{2z-1}$,

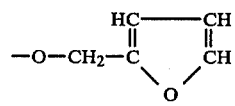

—O—$C_xH_{2x}NH$—R',
—O—$C_xH_{2x}$—NH—$C_xH_{2x}$—OH,

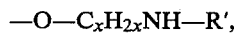

and
—O—$C_xH_{2x}$—O—R' wherein y is an integer from 1 to 3 and R' is an alkyl containing 1 to 4 carbon atoms. x is 1 to 5, Y is bromine or chlorine, z is an integer from 2 to 5 and provided that at least two R groups are OH.

3. The foam of claim 2 wherein R is OH.
4. The foam of claim 2 wherein R is $OC_xH_{2x}OH$.
5. The foam of claim 1 wherein the NCO:OH index is from 150 to 400.

* * * * *